United States Patent
Nagakura et al.

(10) Patent No.: US 11,241,933 B2
(45) Date of Patent: Feb. 8, 2022

(54) LAYOUT STRUCTURE OF REFRIGERANT PIPING NEAR HEAT ACCUMULATOR IN VEHICLE

(71) Applicant: Honda Motor Co., Ltd., Tokyo (JP)

(72) Inventors: Masaki Nagakura, Saitama (JP);
Hajime Uto, Saitama (JP); Masanobu Takazawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/143,169

(22) Filed: Jan. 7, 2021

(65) Prior Publication Data

US 2021/0206228 A1   Jul. 8, 2021

(30) Foreign Application Priority Data

Jan. 8, 2020   (JP) .............................. JP2020-001486

(51) Int. Cl.
*B60H 1/00*   (2006.01)

(52) U.S. Cl.
CPC ..... *B60H 1/00571* (2013.01); *B60H 1/00499* (2019.05)

(58) Field of Classification Search
CPC ........ B60H 1/02; B60H 1/04; B60H 1/00492; B60H 1/00499; B60H 1/00507; B60H 1/00571; B60H 1/00557
See application file for complete search history.

(56) References Cited

U.S. PATENT DOCUMENTS

| | | | | |
|---|---|---|---|---|
| 3,853,270 | A * | 12/1974 | Prebil | B60H 1/00492 237/12.3 B |
| 5,927,381 | A * | 7/1999 | Bednarek | B60H 1/00492 165/41 |
| 8,006,655 | B2 * | 8/2011 | Hiyama | B60H 1/00314 123/41.14 |
| 2010/0257890 | A1 * | 10/2010 | Murakami | F28D 20/021 62/430 |
| 2011/0100021 | A1 * | 5/2011 | Akiyama | B60H 1/00492 62/3.3 |
| 2013/0199751 | A1 * | 8/2013 | Levin | F28D 21/0003 165/10 |

FOREIGN PATENT DOCUMENTS

JP   2008128087   6/2008

* cited by examiner

*Primary Examiner* — Joseph F Trpisovsky
(74) *Attorney, Agent, or Firm* — JCIPRNET

(57) ABSTRACT

Provided is a layout structure of refrigerant piping near a heat accumulator in a vehicle, which is connected to the heat accumulator and can reduce cooling of the refrigerant piping near the heat accumulator due to blowing of wind that comes with running of the vehicle, thereby suppressing heat dissipation of the refrigerant flowing into and out of the heat accumulator. The heat accumulator mounted in a front portion of the vehicle is arranged to extend in a direction substantially orthogonal to a front-rear direction of the vehicle, and has refrigerant inflow part and outflow part at an end. The refrigerant piping includes inflow piping connected to the inflow part and outflow piping connected to the outflow part. The inflow piping and outflow piping are arranged to extend along a length direction of the heat accumulator in a state of being close to a back surface of the heat accumulator.

5 Claims, 3 Drawing Sheets

LAYOUT STRUCTURE OF REFRIGERANT PIPING NEAR HEAT ACCUMULATOR IN VEHICLE

CROSS-REFERENCE TO RELATED APPLICATION

This application claims the priority benefits of Japanese application no. 2020-001486, filed on Jan. 8, 2020. The entirety of the above-mentioned patent application is hereby incorporated by reference herein and made a part of this specification.

BACKGROUND

Technical Field

The disclosure relates to a layout structure of refrigerant piping for flowing in and out a refrigerant, such as cooling water heated by an engine, etc., for a heat accumulator connected to an engine cooling circuit, etc. in a vehicle, and particularly relates to a layout structure of refrigerant piping disposed near a heat accumulator.

Description of Related Art

The system disclosed in Patent Document 1 is known as a conventional vehicle heat accumulation system, which is mounted on a vehicle and includes a heat accumulator that accumulates heat energy by storing the cooling water heated by the engine, and piping for circulating the cooling water. The heat accumulator of the heat accumulation system is formed in a cylindrical shape extending in the vertical direction, and is provided with a vacuum heat insulating layer on the outer peripheral side of the inside and a hot water storage layer that stores cooling water on the inner side. The above-described heat accumulator is provided with an oil storage layer that stores oil of the transmission between the hot water storage layer and the vacuum heat insulating layer.

On the other hand, the piping is composed of double pipes that have an inner pipe and an outer pipe, and oil flows through the inner pipe and cooling water flows between the inner pipe and the outer pipe. In addition, near the heat accumulator, the piping (hereinafter, referred to as "inflow piping" in this column where appropriate) for flowing cooling water into the heat accumulator is connected to a hot water inlet pipe that protrudes on the bottom surface of the heat accumulator, and the piping (hereinafter, referred to as "outflow piping" in this column where appropriate) for flowing cooling water out of the heat accumulator is connected to a hot water outlet pipe that protrudes on the top surface of the heat accumulator. An oil inlet pipe and an oil outlet pipe protrude on the top surface and the bottom surface of the heat accumulator respectively, and the inner pipes that branch from the ends of the outflow piping and the inflow piping are connected to these pipes respectively.

Related Art

Patent Document
 [Patent Document 1] Japanese Laid-Open No. 2008-128087

Problems to be Solved

In the conventional heat accumulation system described above, both the inflow piping connected to the hot water inlet pipe on the bottom surface of the heat accumulator and the outflow piping connected to the hot water outlet pipe on the top surface of the heat accumulator are arranged near the heat accumulator to extend in the radial direction thereof. Therefore, the wind that comes with the running of the vehicle may hit the inflow piping and the outflow piping near the heat accumulator, which may consequently cool the piping and lower the temperature of the cooling water flowing therein. In such a case, when the temperature of the cooling water flowing through the inflow piping is lowered, the temperature of the cooling water stored in the heat accumulator decreases, and the heat energy accumulated in the heat accumulator is lowered. In addition, when the temperature of the cooling water flowing through the outflow piping is lowered, the temperature of the cooling water stored at a high temperature in the heat accumulator cools down, and the transfer efficiency of heat energy from the heat accumulator to the supply destination (engine, transmission, etc.) of the cooling water drops.

SUMMARY

An exemplary embodiment of the disclosure provides a layout structure of refrigerant piping for arranging refrigerant piping 7, which is for flowing a refrigerant into and out of a heat accumulator 5 mounted in a front portion of a vehicle V, near the heat accumulator 5. The heat accumulator is arranged in a manner that an axis in a length direction of the heat accumulator extends in a direction substantially orthogonal to a front-rear direction of the vehicle, and has an inflow part 6a and an outflow part 6b for the refrigerant at an end of the heat accumulator. The refrigerant piping has inflow piping 7a connected to the inflow part and outflow piping 7b connected to the outflow part. The inflow piping and the outflow piping are arranged to extend along the length direction of the heat accumulator in a state of being close to a back surface of the heat accumulator.

Figure 3:
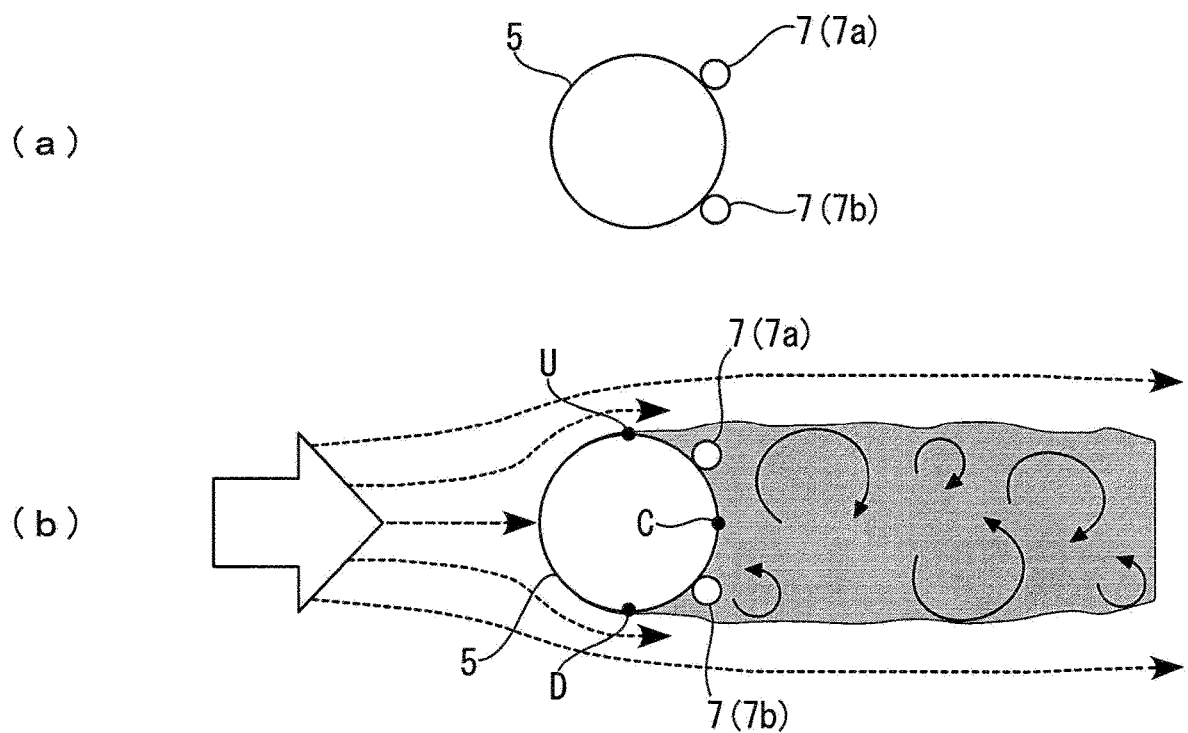

(a) of FIG. 3 is a view for illustrating a positional relationship between the heat accumulator and the refrigerant piping, and (b) of FIG. 3 is a view for illustrating a state when wind hits the heat accumulator from the front.

Figure 4:
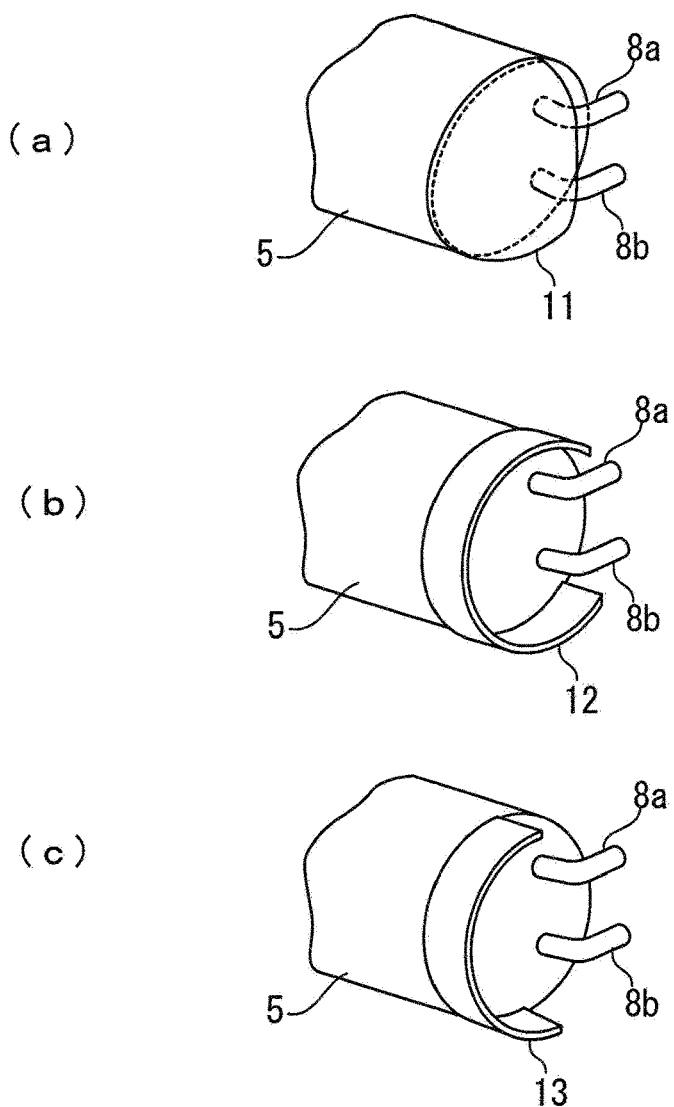

(a), (b), and (c) of FIG. 4 show various covers provided at a connection portion of the heat accumulator with the refrigerant piping.

Figure 5:
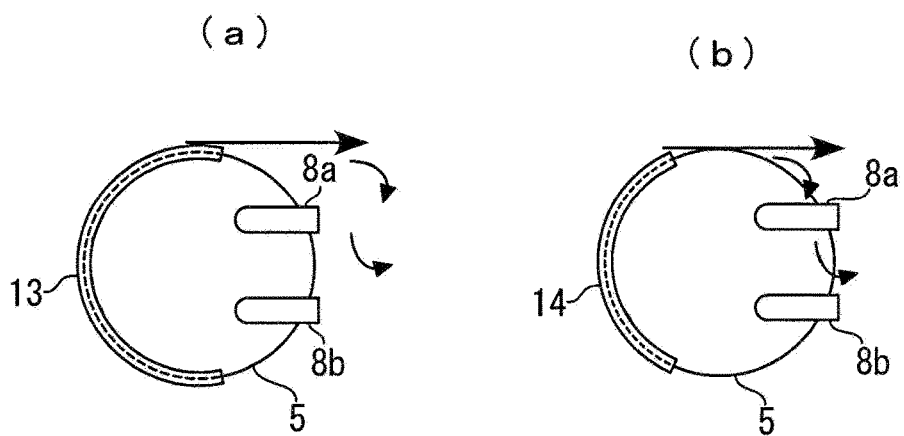

FIG. 5 includes views for illustrating the flow of wind near an end of the heat accumulator due to the difference in the shape of the cover, wherein (a) shows a cover having a semicircular side surface shape, and (b) shows a cover having a smaller length in the circumferential direction than the cover of (a).

DESCRIPTION OF THE EMBODIMENTS

In view of the above, the disclosure provides a layout structure of refrigerant piping near a heat accumulator in a vehicle, which is connected to the heat accumulator and can reduce cooling of the refrigerant piping near the heat accumulator due to blowing of the wind that comes with the running of the vehicle, thereby effectively suppressing heat dissipation of the refrigerant flowing into and out of the heat accumulator.

Means for Solving the Problems

An exemplary embodiment of the disclosure provides a layout structure of refrigerant piping for arranging refrigerant piping 7, which is for flowing a refrigerant into and out of a heat accumulator 5 mounted in a front portion of a vehicle V, near the heat accumulator 5. The heat accumulator is arranged in a manner that an axis in a length direction of the heat accumulator extends in a direction substantially orthogonal to a front-rear direction of the vehicle, and has an inflow part 6a and an outflow part 6b for the refrigerant at an end of the heat accumulator. The refrigerant piping has inflow piping 7a connected to the inflow part and outflow piping 7b connected to the outflow part. The inflow piping and the outflow piping are arranged to extend along the length direction of the heat accumulator in a state of being close to a back surface of the heat accumulator.

The "substantially orthogonal" described herein includes not only an orthogonal state but also a state of being slightly inclined with respect to that state. In addition, the "state of being close to the back surface of the heat accumulator" includes not only a state of being in contact with the back surface of the heat accumulator but also a state where a slight gap is present with respect to the back surface (the same applies hereinafter in this specification).

According to the above configuration, the heat accumulator mounted in the front portion of the vehicle is arranged in a manner that the axis in the length direction of the heat accumulator extends in a direction substantially orthogonal to the front-rear direction of the vehicle. Further, an end of the heat accumulator is provided with the inflow part and the outflow part for the refrigerant, and the inflow piping and the outflow piping of the refrigerant piping are respectively connected to the inflow part and the outflow part. Then, the inflow piping and the outflow piping are arranged to extend along the length direction of the heat accumulator in a state of being close to the back surface of the heat accumulator. Thus, even if the wind is received from the front during the running of the vehicle and the wind hits the front surface of the heat accumulator, the wind can be suppressed from hitting the inflow piping and the outflow piping that are close to the back surface of the heat accumulator. As a result, it is possible to reduce the cooling of the refrigerant flowing through the inflow piping and the outflow piping, thereby effectively suppressing heat dissipation of the refrigerant flowing into and out of the heat accumulator.

According to an exemplary embodiment of the disclosure, in the layout structure of the refrigerant piping near the heat accumulator in the vehicle, the heat accumulator has an outer shape formed in a columnar shape and is arranged in a manner that the axis in the length direction of the heat accumulator extends in a left-right direction of the vehicle. One of the inflow piping and the outflow piping is arranged above a center C in a vertical direction of the back surface of the heat accumulator and below an upper end U of the heat accumulator, and the other of the inflow piping and the outflow piping is arranged below the center C in the vertical direction of the back surface of the heat accumulator and above a lower end D of the heat accumulator.

According to this configuration, the heat accumulator has an outer shape formed in a columnar shape and is arranged in a manner that the axis in the length direction extends in the left-right direction. When the vehicle equipped with such a heat accumulator runs, the wind from the front hits the heat accumulator. The wind that hits the heat accumulator flows along the surface of the heat accumulator to be divided in the circumferential direction, and flows away from the surface of the heat accumulator, that is, peels off and flows backward, near the upper end and the lower end of the outer peripheral surface of the heat accumulator. As a result, on the back surface side of the heat accumulator, two regions (hereinafter, referred to as "peeling regions" in this column) in which the wind flow is relatively gentle and which are connected to each other are respectively defined above the center in the vertical direction and below the upper end of the heat accumulator and below the center in the vertical direction and above the lower end of the heat accumulator. Therefore, by arranging the inflow piping and the outflow piping in the upper and lower peeling regions, the wind flowing along the surface of the piping can be suppressed. In addition, as the inflow piping and the outflow piping are arranged near the upper end and the lower end on the back surface side of the heat accumulator, the inflow piping and the outflow piping do not greatly stick out in the radial direction of the heat accumulator, as compared with the case where the inflow piping and the outflow piping are arranged side by side near the center in the vertical direction on the back surface side of the heat accumulator, for example. Therefore, at the time of manufacturing the vehicle, it is easy to handle and install the heat accumulator including the inflow piping and the outflow piping.

According to an exemplary embodiment of the disclosure, in the layout structure of the refrigerant piping near the heat accumulator in the vehicle, the inflow part and the outflow part are arranged side by side vertically on one end surface of the heat accumulator.

According to this configuration, since the inflow part and the outflow part are arranged side by side vertically on one end surface of the heat accumulator that extends in the left-right direction, the inflow part and the outflow part and the inflow piping and the outflow piping respectively arranged in the upper and lower peeling regions of the heat accumulator can be connected relatively easily.

According to an exemplary embodiment of the disclosure, in the layout structure of the refrigerant piping near the heat accumulator in the vehicle, the end of the heat accumulator, at which the inflow part and the outflow part are provided, is provided with an inflow connection part 8a that connects the inflow part and the inflow piping, and an outflow connection part 8b that connects the outflow part and the outflow piping, and the end of the heat accumulator is provided with a cover 11, 12, and 13 that covers at least a front of the inflow connection part and the outflow connection part.

According to this configuration, at the end of the heat accumulator, the inflow part of the heat accumulator and the inflow piping are connected via the inflow connection part, and the outflow part and the outflow piping are connected via the outflow connection part. Further, at the end of the heat accumulator, the cover is provided to cover at least the front of the inflow connection part and the outflow connection part. By using the cover to cover the inflow connection part and the outflow connection part, it is possible to prevent the wind from the front from directly hitting the inflow connection part and the outflow connection part, and it is possible to effectively suppress the temperature drop of the refrigerant flowing through the connection parts.

According to an exemplary embodiment of the disclosure, in the layout structure of the refrigerant piping near the heat accumulator in the vehicle, the cover protrudes from an end surface of the heat accumulator by a predetermined length in the length direction of the heat accumulator, extends in an arc shape along a peripheral edge of the end surface, and a side surface shape of the cover is formed in a semicircular shape that is convex to the front.

According to this configuration, since the cover protrudes in the length direction of the heat accumulator by a predetermined length and extends in an arc shape along the peripheral edge of the end surface of the heat accumulator, and a side surface shape of the cover is formed in a semicircular shape that is convex to the front, an effective windbreak cover for the inflow connection part and the outflow connection part can be easily realized with the minimum necessary structure and size.

Figure 1:
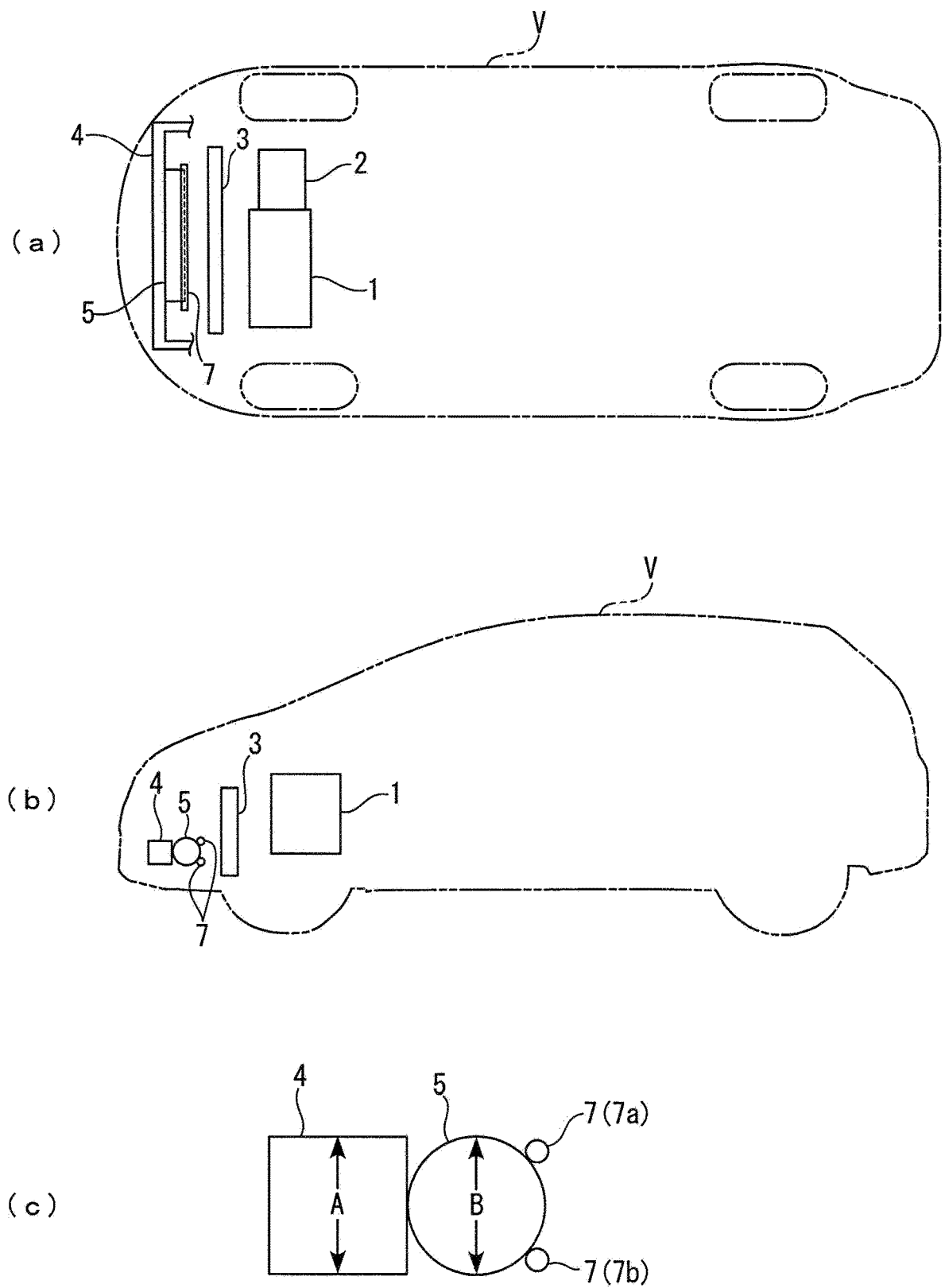
FIG. 1 schematically shows the appearance of a vehicle to which a layout structure of refrigerant piping near a heat accumulator according to an embodiment of the disclosure is applied, wherein (a) is a plan view, (b) is a side view, and (c) is a side view enlarging the heat accumulator and its surroundings.

Hereinafter, exemplary embodiments of the disclosure will be described in detail with reference to the drawings. (a) and (b) of FIG. 1 schematically show the appearance of a vehicle to which a layout structure of refrigerant piping near a heat accumulator according to an embodiment of the disclosure is applied. As shown in the figure, the vehicle V is a four-wheeled vehicle equipped with an engine 1 and a transmission 2 in the engine room at the front portion (left portion of (a) and (b) of FIG. 1). Further, in the engine room of the vehicle V, a radiator 3 that dissipates heat of a refrigerant (for example, cooling water) for cooling the engine 1, etc. is arranged in front of the engine 1. In addition, in the front portion of the vehicle V, a bumper beam 4 extending in the left-right direction (vertical direction in (a) of FIG. 1) is provided in front of the radiator 3, and a heat accumulator 5 is arranged on the back surface side (right side in (a) and (b) of FIG. 1) of the bumper beam 4.

The bumper beam 4 is made of a metal, a synthetic resin, etc. having high strength, and has a rectangular cross section. In addition, the bumper beam 4 has a predetermined height dimension A in the vertical direction orthogonal to the length direction thereof.

Figure 2:
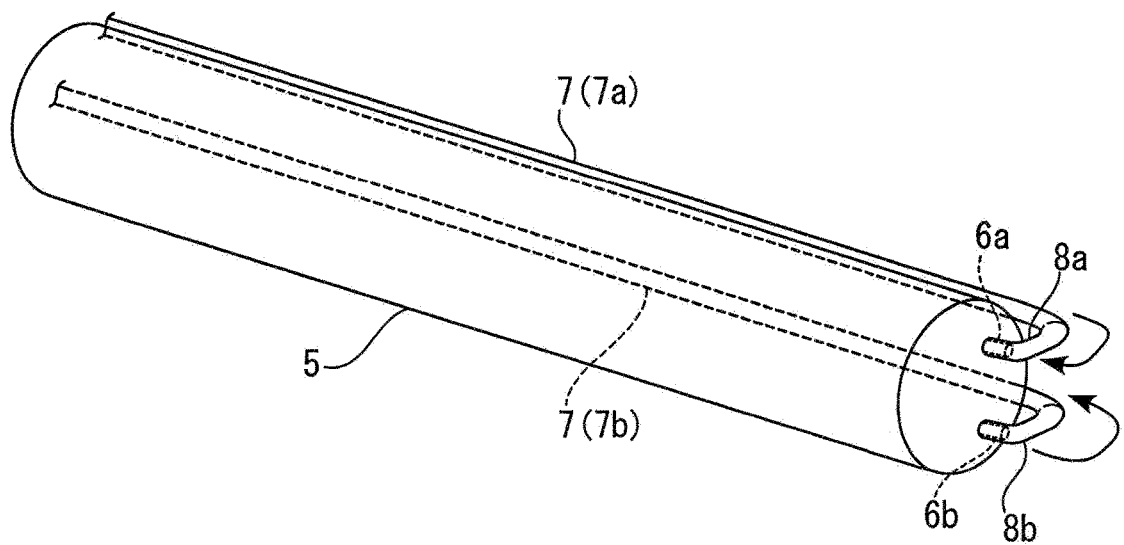
FIG. 2 is a perspective view showing the heat accumulator and the refrigerant piping connected thereto.

As shown in (c) of FIG. 1 and FIG. 2, the heat accumulator 5 is formed in a columnar shape having a predetermined outer diameter B and a length, and can store a predetermined volume (for example, 4 liters) of a refrigerant inside and keep warm. Further, as shown in (a) and (b) of FIG. 1, the heat accumulator 5 is arranged to extend along the length direction of the bumper beam 4, that is, the left-right direction of the vehicle V. An inflow part 6a and an outflow part 6b of the refrigerant protrude on an end surface of one side (right side in FIG. 2) of the heat accumulator 5, and are arranged one above the other at a predetermined interval.

Furthermore, upper refrigerant piping 7 and lower refrigerant piping 7 extending along the length direction of the heat accumulator 5 are arranged on the back surface of the heat accumulator 5. Specifically, among the two sets of refrigerant piping 7, the upper one is inflow piping 7a for flowing the refrigerant into the heat accumulator 5 and the lower one is outflow piping 7b for flowing the refrigerant out of the heat accumulator 5. In addition, the above-described inflow piping 7a and the outflow piping 7b are respectively connected to the inflow part 6a and the outflow part 6b of the heat accumulator 5 via predetermined connection parts (inflow connection part 8a and outflow connection part 8b). Thus, as indicated by the arrow in FIG. 2, the refrigerant flowing through the inflow piping 7a turns around from the back surface side to the right end surface side of the heat accumulator 5 and flows into the heat accumulator 5. On the other hand, the refrigerant flowing out of the heat accumulator 5 turns around from the right end surface side to the back surface side of the heat accumulator 5 and flows into the outflow piping 7b.

The inflow piping 7a and the outflow piping 7b are attached in a state of being close to the back surface of the heat accumulator 5 by a predetermined mounting bracket (not shown).

Here, the layout structure of the upper and lower refrigerant piping 7 for the heat accumulator 5 will be described with reference to (a) and (b) of FIG. 3. (a) of FIG. 3 shows the outer shape of the cross section of the heat accumulator 5 and the two sets of refrigerant piping 7. As shown in (b) of FIG. 3, when wind (white arrow) from the front (left in FIG. 3) hits the heat accumulator 5, the wind flows up and down along the surface of the heat accumulator 5, as indicated by the dashed arrows, and flows away from the surface of the heat accumulator 5, that is, peels off and flows backward (right in FIG. 3) near the upper end (point U) and the lower end (point D) of the heat accumulator 5. As a result, on the back surface side (right side in FIG. 3) of the heat accumulator 5, two regions (hereinafter, referred to as "peeling regions") in which the wind flow is relatively gentle and which are connected to each other are respectively defined above the center C (point C) in the vertical direction and below the upper end U of the heat accumulator 5 and below the center C and above the lower end D. Then, in these upper and lower peeling regions, the inflow piping 7a and the outflow piping 7b are respectively arranged near the upper end U and the lower end D of the heat accumulator 5.

As shown in (b) of FIG. 3, when the wind hits the heat accumulator 5 from the front and the Reynolds number is within a predetermined range, Karman vortices are generated behind the heat accumulator 5, but these vortices rarely affect the inflow piping 7a and the outflow piping 7b.

(a), (b), and (c) of FIG. 4 show various covers that cover at least the front of the inflow connection part 8a and the outflow connection part 8b, which are the connection portions of the heat accumulator 5 with the refrigerant piping 7, and are attached to the end on the right side of the heat accumulator. The cover 11 shown in (a) of FIG. 4 is formed in a semi-dome shape convex to the right of the heat accumulator 5. Further, the cover 12 shown in (b) of FIG. 4 protrudes to the right of the heat accumulator 5 by a predetermined length and extends along the peripheral edge of the right end surface of the heat accumulator 5 by a predetermined length, and a side surface shape of the cover 12 is formed in a C shape that is convex to the front. Further, the cover 13 shown in (c) of FIG. 4 extends along the peripheral edge of the right end surface of the heat accumulator 5 by a length slightly smaller than that of the cover 12, and extends between the upper end and the lower end of the heat accumulator 5, and a side surface shape of the cover 13 is formed in a semicircular shape that is convex to the front.

(a) of FIG. 5 shows a state when the heat accumulator 5 receives wind from the front in the case where the cover 13 in (c) of FIG. 4 is attached to the right end of the heat accumulator 5. Further, (b) of FIG. 5 shows a cover 14 having a smaller length in the circumferential direction than the cover 13 for comparison with the cover 13 in (a) of FIG. 5.

As shown in (b) of FIG. 5, for the cover 14 having a small length in the circumferential direction, after the wind coming from the front of the heat accumulator 5 passes the cover 14, the wind flow may be turbulent in the latter half of the heat accumulator 5, and the inflow connection part 8a and the outflow connection part 8b may be cooled.

In contrast, for the cover 13 shown in (a) of FIG. 5, after the wind coming from the front of the heat accumulator 5 passes the cover 13 and further passes the inflow connection part 8a and the outflow connection part 8b, the flow is turbulent. From the above, with the cover 14 in (b) of FIG. 5, the inflow connection part 8a and the outflow connection part 8b may be cooled, but if the cover 13 in (a) of FIG. 5 is used, the windbreak function of the connection portion of the heat accumulator 5 with the refrigerant piping 7 can be appropriately exhibited with the minimum necessary structure and size.

As described in detail above, according to the present embodiment, the inflow piping 7a and the outflow piping 7b are respectively arranged in the upper and lower peeling regions to extend along the length direction of the heat accumulator 5 in a state of being close to the back surface of the heat accumulator 5, which extends in the left-right direction of the vehicle V. Thus, even if the wind is received from the front during the running of the vehicle V and the wind hits the front surface of the heat accumulator 5, the wind can be suppressed from hitting the inflow piping 7a and the outflow piping 7b on the back surface side of the heat accumulator 5. As a result, it is possible to reduce the cooling of the refrigerant flowing through the inflow piping 7a and the outflow piping 7b, thereby effectively suppressing heat dissipation of the refrigerant flowing into and out of the heat accumulator 5.

Furthermore, as the inflow piping 7a and the outflow piping 7b are arranged near the upper end and the lower end on the back surface side of the heat accumulator 5, the inflow piping 7a and the outflow piping 7b do not greatly stick out in the radial direction of the heat accumulator 5, as compared with the case where the inflow piping 7a and the outflow piping 7b are arranged side by side near the center in the vertical direction on the back surface side of the heat accumulator 5, for example. Therefore, at the time of manufacturing the vehicle V, it is easy to handle and install the heat accumulator 5 including the inflow piping 7a and the outflow piping 7b.

In addition, since the inflow part 6a and the outflow part 6b provided on the end surface of the heat accumulator 5 are arranged side by side vertically, the inflow part 6a and the outflow part 6b and the inflow piping 7a and the outflow piping 7b respectively arranged in the upper and lower peeling regions on the back surface side of the heat accumulator 5 can be connected relatively easily.

Further, by providing the cover 11, 12, or 13 at the end of the heat accumulator 5 to cover the front of the inflow connection part 8a and the outflow connection part 8b, it is possible to prevent the wind from the front from directly hitting the inflow connection part 8a and the outflow connection part 8b, and it is possible to effectively suppress the temperature drop of the refrigerant flowing through these connection parts 8a and 8b.

Nevertheless, the disclosure is not limited to the above-described embodiment and can be implemented in various forms. For example, in the embodiment, the heat accumulator 5 is formed in a columnar shape, but the disclosure is not limited thereto, and for example, the heat accumulator 5 may have a triangular, quadrangular, or polygonal cross section. Further, in the embodiment, the heat accumulator 5 is arranged to extend in the left-right direction of the vehicle V. Since in the disclosure the heat accumulator 5 may be arranged to extend in a direction substantially orthogonal to the front-rear direction of the vehicle V, the heat accumulator 5 may also be arranged to extend in the vertical direction, for example.

In addition, in the embodiment, the inflow piping 7a and the outflow piping 7b are respectively arranged near the upper end and the lower end on the back surface side of the heat accumulator 5, but the disclosure is not limited thereto, and the piping 7a and 7b may be arranged to extend along the length direction of the heat accumulator 5 in a state of being close to the back surface of the heat accumulator 5. Therefore, the inflow piping 7a and the outflow piping 7b may also be arranged near the center in the vertical direction on the back surface side of the heat accumulator 5, for example.

Further, the detailed configurations of the heat accumulator 5 and the refrigerant piping 7 shown in the embodiment are merely examples, and can be appropriately changed within the scope of the gist of the disclosure.

What is claimed is:

1. A layout structure of refrigerant piping near a heat accumulator in a vehicle, for arranging the refrigerant piping near the heat accumulator, which is for flowing a refrigerant into and out of the heat accumulator mounted in a front portion of the vehicle, wherein
    the heat accumulator is arranged in a manner that an axis in a length direction of the heat accumulator extends in a direction substantially orthogonal to a front-rear direction of the vehicle, and comprises an inflow part and an outflow part for the refrigerant at an end of the heat accumulator,
    the refrigerant piping comprises inflow piping connected to the inflow part and outflow piping connected to the outflow part, and
    the inflow piping and the outflow piping are arranged to extend along the length direction of the heat accumulator in a state of being close to a back surface of the heat accumulator.

2. The layout structure of the refrigerant piping near the heat accumulator in the vehicle according to claim 1, wherein
    the heat accumulator has an outer shape formed in a columnar shape and is arranged in a manner that the axis in the length direction of the heat accumulator extends in a left-right direction of the vehicle,
    one of the inflow piping and the outflow piping is arranged above a center in a vertical direction of the back surface of the heat accumulator and below an upper end of the heat accumulator, and
    the other of the inflow piping and the outflow piping is arranged below the center in the vertical direction of the back surface of the heat accumulator and above a lower end of the heat accumulator.

3. The layout structure of the refrigerant piping near the heat accumulator in the vehicle according to claim 2, wherein the inflow part and the outflow part are arranged side by side vertically on an end surface of one side of the heat accumulator.

4. The layout structure of the refrigerant piping near the heat accumulator in the vehicle according to claim 3, wherein the end of the heat accumulator, at which the inflow part and the outflow part are provided, is provided with an inflow connection part that connects the inflow part and the inflow piping, and an outflow connection part that connects the outflow part and the outflow piping, and
    the end of the heat accumulator is provided with a cover that covers at least a front of the inflow connection part and the outflow connection part.

5. The layout structure of the refrigerant piping near the heat accumulator in the vehicle according to claim 4, wherein the cover protrudes from an end surface of the heat accumulator by a predetermined length in the length direction of the heat accumulator, extends in an arc shape along a peripheral edge of the end surface, and a side surface shape of the cover is formed in a semicircular shape that is convex to the front.

\* \* \* \* \*